United States Patent
Zhang et al.

(10) Patent No.: US 9,807,705 B2
(45) Date of Patent: Oct. 31, 2017

(54) METHOD AND DEVICE FOR CONTROLLING TRANSMITTING POWER (71) Applicant: ZTE Corporation, Shenzhen (CN)

(72) Inventors: Feifei Zhang, Shenzhen (CN); Qian Qi, Shenzhen (CN); Zhiqiang Hou, Shenzhen (CN)

(73) Assignee: XI'AN ZHONGXING NEW SOFTWARE CO. LTD, Xi'An (CN)

( * ) Notice: Subject to any disclaimer, the term of this patent is extended or adjusted under 35 U.S.C. 154(b) by 0 days.

(21) Appl. No.: 15/034,945

(22) PCT Filed: Feb. 13, 2014

(86) PCT No.: PCT/CN2014/072014
§ 371 (c)(1),
(2) Date: May 6, 2016

(87) PCT Pub. No.: WO2014/134996
PCT Pub. Date: Sep. 12, 2014

(65) Prior Publication Data
US 2016/0345275 A1 Nov. 24, 2016

(30) Foreign Application Priority Data
Nov. 7, 2013 (CN) .......................... 2013 1 0548102

(51) Int. Cl.
H04B 7/00 (2006.01)
H04B 1/04 (2006.01)
(Continued)

(52) U.S. Cl.
CPC ......... *H04W 52/283* (2013.01); *H04W 4/023* (2013.01); *H04W 52/367* (2013.01);
(Continued)

(58) Field of Classification Search
CPC . H04B 1/3838; H04B 17/102; H04W 52/283; H04W 52/365
(Continued)

(56) References Cited

U.S. PATENT DOCUMENTS 5,805,067 A 9/1998 Bradley et al.
8,738,093 B1 * 5/2014 Gopalakrishnan ........................ H04W 52/0261
455/100

(Continued)

FOREIGN PATENT DOCUMENTS

WO 2012176217 A 12/2012

OTHER PUBLICATIONS

International Search Report for corresponding application PCT/CN2014/072014 filed on Feb. 13, 2014; dated Aug. 6, 2014.
(Continued)

Primary Examiner — Simon Nguyen
(74) Attorney, Agent, or Firm — Cantor Colburn LLP (57) ABSTRACT Provided are a method and device for controlling transmitting power. According to the method, when it is detected that a target object approaches a mobile terminal, a position, which the target object approaches, on the mobile terminal is determined, and an optimal sensing area for a Specific Absorption Rate (SAR) reducing antenna of the mobile terminal to sense a movement of the target object is selected according to the position; movement information of the target object is acquired by sensing the movement of the target object in the optimal sensing area by the SAR reducing antenna, and the transmitting power of the mobile terminal is controlled according to the movement information. The technical solution can improve the sensing distance and range of the SAR reducing antenna, namely, improve the sensitivity of the SAR reducing antenna.

12 Claims, 4 Drawing Sheets (51) Int. Cl.
    *H01Q 11/12*      (2006.01)
    *H04W 52/28*      (2009.01)
    *H04W 52/36*      (2009.01)
    *H04W 4/02*       (2009.01)
    *H04W 64/00*      (2009.01)

(52) U.S. Cl.
    CPC ........ *H04W 64/006* (2013.01); *H04W 52/285* (2013.01); *H04W 52/288* (2013.01)

(58) Field of Classification Search
    USPC ................ 455/106, 114.1, 127.1, 522
    See application file for complete search history.

(56) References Cited

U.S. PATENT DOCUMENTS

| | | | | |
|---|---|---|---|---|
| 9,374,655 | B1* | 6/2016 | Lee | H04W 4/008 |
| 2010/0056210 | A1* | 3/2010 | Bychkov | H04B 1/3838 |
| | | | | 455/556.1 |
| 2011/0222469 | A1* | 9/2011 | Ali | H04L 1/0003 |
| | | | | 370/328 |
| 2012/0021707 | A1* | 1/2012 | Forrester | H04W 52/281 |
| | | | | 455/103 |
| 2012/0021800 | A1* | 1/2012 | Wilson | H04W 52/146 |
| | | | | 455/550.1 |
| 2012/0147801 | A1* | 6/2012 | Ho | H04W 52/365 |
| | | | | 370/311 |
| 2012/0190398 | A1 | 7/2012 | Leukkunen | |
| 2012/0214422 | A1 | 8/2012 | Shi et al. | |
| 2012/0258772 | A1 | 10/2012 | Brogle | |
| 2013/0169348 | A1 | 7/2013 | Shi | |
| 2014/0128032 | A1* | 5/2014 | Muthukumar | H04M 1/72569 |
| | | | | 455/411 |
| 2014/0213192 | A1* | 7/2014 | Lagnado | H04W 52/0254 |
| | | | | 455/67.11 |
| 2015/0017935 | A1* | 1/2015 | Sundaram | H04W 52/283 |
| | | | | 455/127.2 |
| 2016/0165551 | A1* | 6/2016 | Lagnado | H04L 43/10 |
| | | | | 370/311 |

OTHER PUBLICATIONS

Supplementary European Search Report Application No. EP14760379 dated Sep. 29, 2016, pp. 7.

* cited by examiner

METHOD AND DEVICE FOR CONTROLLING TRANSMITTING POWER

TECHNICAL FIELD

The present disclosure relates to the field of mobile communications, particularly to a method and device for controlling transmitting power.

BACKGROUND

Mobile terminals, which have become indispensable communication and entertainment tools in work and life at present, are being developed to become intelligent with large screens. At present, smart phones with large screens and tablet computers are being used more and more widely, and have shown a sign of invading and occupying the market of Personal Computers (PC). Therefore, there is no doubt that device manufacturers are attaching importance to and invest on mobile terminals.

On the other hand, however, the impact caused by radiation of mobile terminals on human bodies also causes attention of various countries, organizations and consumers. At present, the result of a Specific Absorption Rate (SAR) test is a very important index in certification of mobile terminals, especially tablet computer products, and an impact of these kinds of products on a human body is largely reduced by the constraint of an SAR on the radiation performance of the products. Currently, an SAR reducing method is used in the products. The proximity of the human body is detected by an SAR reducing antenna, i.e. a sensor, so as to control and reduce the output power of the mobile terminal. The processing method above, which is generally applied in a tablet computer, and will be also used in a mobile phone sooner or later as the size of the mobile phone is becoming close to that of the tablet computer, is advantageous in that a degree of reduction is flexible and controllable, but has a disadvantage that the sensibility (a sensing range) for the SAR reducing antenna to sense the proximity of the human body limits the change sensibility of the radiation power of the mobile terminal, thus resulting in erroneous judgment, e.g., the sensor has started working when the human body has not been close to the terminal, or the sensor has not started working when the human body has been close to the terminal.

SUMMARY

A method and device for controlling transmitting power are provided so as to solve the problem of inaccurate sensibility of an SAR reducing antenna.

An embodiment of the present disclosure provides a method for controlling transmitting power, including that: when it is detected that a target object approaches a mobile terminal, a position, which the target object approaches, on the mobile terminal is determined, and an optimal sensing area for an SAR reducing antenna of the mobile terminal to sense a movement of the target object is selected according to the position; and movement information of the target object is acquired by sensing the movement of the target object in the optimal sensing area by the SAR reducing antenna, and the transmitting power of the mobile terminal is controlled according to the movement information.

In an example embodiment, the method may further includes that: the position, which the target object approaches, on the mobile terminal is re-determined at a preset time interval, and whether the position acquired currently is the same as that determined in a previous period is judged; and when the position acquired currently is the same as that determined in the previous period, an optimal sensing area determined in the previous period is used as the current optimal sensing area; when the position acquired currently is different from that determined in the previous period, the optimal sensing area for the SAR reducing antenna to sense the movement of the target object is re-determined according to the position acquired currently.

In an example embodiment, a range of the position, which the target object approaches, on the mobile terminal may be: an area in a preset range taking a communication antenna of the mobile terminal as a centre.

In an example embodiment, the optimal sensing area may be an area in a preset range closest to the target object.

In an example embodiment, acquiring the movement information of the target object by sensing the movement of the target object in the optimal sensing area by the SAR reducing antenna, and controlling the transmitting power of the mobile terminal according to the movement information may include that: a logical selection switch is switched to connect different access ports preset on the SAR reducing antenna to the SAR reducing antenna; the movement of the target object is sensed in the optimal sensing area through various access ports of the SAR reducing antenna, and movement information of the target object is acquired from the various access ports respectively; when the movement information acquired from all of the various access ports fails to reach a preset threshold, the transmitting power of the mobile terminal is not adjusted; when movement information acquired from a certain one of the various access ports reaches the preset threshold, the logical selection switch is switched to the access port, and the transmitting power of the mobile terminal is controlled according to the movement information acquired from the access port; and when movement information acquired from a plurality of access ports reaches the preset threshold, the movement information acquired from the plurality of access ports is compared, and the logical selection switch is switched to an access port of optimal sensing according to a comparison result, and the transmitting power of the mobile terminal is controlled according to the movement information acquired from the access port.

An embodiment of the present disclosure further provides a device for controlling transmitting power, including: a judging and selecting component, configured to, when it is detected that a target object approaches a mobile terminal, determine a position, which the target object approaches, on the mobile terminal, and select according to the position, an optimal sensing area for an SAR reducing antenna of the mobile terminal to sense a movement of the target object; sense the movement of the target object in the optimal sensing area through the SAR reducing antenna and feed back movement information of the target object; and a power control component, configured to acquire the movement information, and control the transmitting power of the mobile terminal according to the movement information.

In an example embodiment, the judging and selecting component may be further configured to: re-determine a position, which the target object approaches, on the mobile terminal at a preset time interval, and judge whether the position acquired currently is the same as that determined in a previous period; and when the position acquired currently is the same as that determined in the previous period, use an optimal sensing area determined in the previous period as the current optimal sensing area; when the position acquired currently is different from that determined in the previous period, re-determine, according to the position acquired currently, the optimal sensing area for the SAR reducing antenna to sense the movement of the target object.

In an example embodiment, a range of the position, which the target object approaches, on the mobile terminal may be: an area in a preset range taking a communication antenna of the mobile terminal as a centre.

In an example embodiment, the optimal sensing area may be an area in a preset range closest to the target object.

In an example embodiment, the judging and selecting component may be configured to: switch a logical selection switch to connect different access ports preset on the SAR reducing antenna to the SAR reducing antenna; sense the movement of the target object in the optimal sensing area through various access ports of the SAR reducing antenna, and respectively acquire movement information of the target object from the various access ports; when the movement information acquired from all of the various access ports fails to reach a preset threshold, not feed back the movement information; when movement information acquired from a certain one of the various access ports reaches the preset threshold, switch the logical selection switch to the access port, and feed back the movement information acquired from the access port; and when movement information acquired from a plurality of access ports reaches the preset threshold, compare the movement information acquired from the plurality of access ports, switch the logical selection switch to an access port of optimal sensing according to a comparison result, and feed back the movement information acquired from the access port.

The embodiments of the present disclosure have the following beneficial effect.

The position, which a human body approaches, on a mobile terminal is judged dynamically so that an optimal working mode of an SAR reducing antenna can be selected to sense a range of the distance between the human body and the mobile terminal and at the same time feed back this information to the mobile terminal, and the mobile terminal controls the radiation power thereof dynamically according to the fed-back information. In this way, it can be ensured at all time that the position of the approaching human body is sensed by the SAR reducing antenna in the optimal working mode, thereby improving the sensing distance and range of the SAR reducing antenna, namely, improving the sensitivity of the SAR reducing antenna.

The description above is only a summary of the technical solutions of the embodiments of the present disclosure, specific implementation modes of the embodiments of the present disclosure will be illustrated specifically below so that the technical means of the embodiments of the present disclosure may be understood more clearly and thus can be implemented according to the content of the specification and the aforementioned and other purposes, characteristics and advantages of the embodiments of the present disclosure are more apparent and easily understood.

BRIEF DESCRIPTION OF THE DRAWINGS

By reading the detailed description of the example embodiments hereinafter, various other advantages and benefits will become apparent for those of ordinary skill in the art. The accompanying drawings are used for illustrating the example embodiments, but should not be construed as limitation to the present disclosure, and in all accompanying drawings, the same components are represented by the same reference numerals. In the accompanying drawings.

DETAILED DESCRIPTION OF THE EMBODIMENTS

Exemplary embodiments of the present disclosure will be described in more details hereinafter with reference to the accompanying drawings. Although the exemplary embodiments of the present disclosure have been shown in the accompanying drawings, it should be understood that the present disclosure may be implemented in various forms and should not be limited by the embodiments elaborated herein. On the contrary, these embodiments are provided so that the present disclosure may be understood more thoroughly, and the scope of the present disclosure may be completely conveyed to those skilled in the art.

In the related art, a common SAR reducing method fails to judge an accurate position, which a human body approaches, on a mobile terminal, and is unable to sense the proximity of the human body with an optimal working mode of a sensor antenna, thus a sensing range of the sensor antenna is too close and too narrow, or even erroneous judgment is caused, and the radiation power of the mobile terminal can be hardly controlled in time, and the human body cannot be protected in time. Therefore, the embodiments of the present disclosure provide a method and device for controlling transmitting power so as to solve the problem of inaccurate sensibility of an SAR reducing antenna (also hereinafter referred to as a sensor antenna) in the related art. In the technical solutions of the embodiments of the present disclosure, the position, which a human body approaches, on a mobile terminal is judged dynamically so that an optimal working mode of a sensor antenna can be selected to sense a range of the distance between the human body and the mobile terminal and at the same time feed back this information to the mobile terminal, and the mobile terminal controls the radiation power thereof dynamically according to the fed-back information. The technical solutions of the embodiments of the present disclosure can ensure at all time that the position of the approaching human body is sensed by the sensor antenna in the optimal working mode, thereby improving the sensing distance and range of a sensor, namely, improving the sensitivity of the sensor. In addition, in some example embodiments of the present disclosure, although the sensor antenna is required to provide more than two access ports and a logical selection switch for a selecting purpose is added preferably in hardware design, compared with an existing mobile terminal with an additional SAR reducing function, the layout of the whole device will be hardly affected.

The embodiments of the present disclosure will be further expounded below in combination with the accompanying drawings and embodiments. It should be understood that the specific embodiments described herein are only used for explaining the present disclosure, instead of limiting the present disclosure.

Method Embodiment

Figure 1:
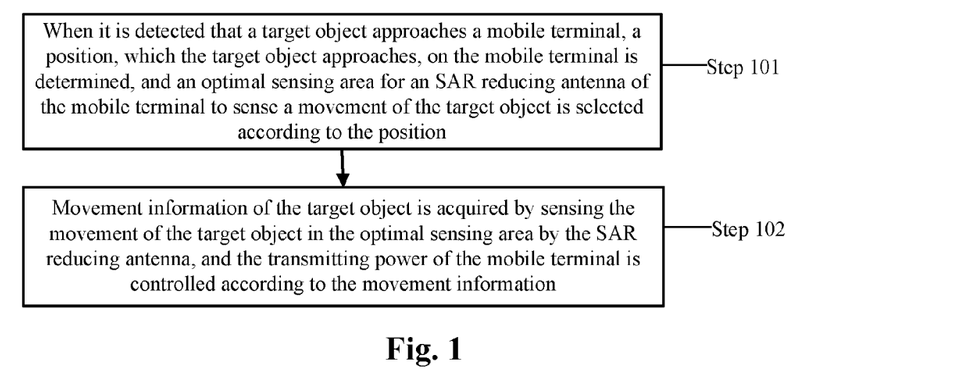
FIG. 1 is a flowchart of a method for controlling transmitting power according to an embodiment of the present disclosure.

A method for controlling transmitting power is provided according to an embodiment of the present disclosure. FIG. 1 is a flowchart of a method for controlling transmitting power according to an embodiment of the present disclosure. As shown in FIG. 1, the method for controlling transmitting power according to the embodiment of the present disclosure includes the following processing.

Step 101: When it is detected that a target object approaches a mobile terminal, a position, which the target object approaches, on the mobile terminal is determined, and an optimal sensing area for an SAR reducing antenna of the mobile terminal to sense a movement of the target object is selected according to the position. Since a mobile terminal has little impact on a human body when the human body is far from a communication antenna, a range of the position, which the target object approaches, on the mobile terminal may be set as: an area in a preset range taking a communication antenna of the mobile terminal as a centre. In addition, since a sensor antenna area closer to the human body has a longer sensing distance for the human body, i.e. has higher sensibility, the optimal sensing area may be set as an area in a preset range closest to the target object.

Step 102: Movement information of the target object is acquired by sensing the movement of the target object in the optimal sensing area by the SAR reducing antenna, and the transmitting power of the mobile terminal is controlled according to the movement information.

In an example embodiment, the position, which the target object approaches, on the mobile terminal is re-determined at a preset time interval, and whether the position acquired currently is the same as that determined in a previous period is judged; and when the position acquired currently is the same as that determined in the previous period, an optimal sensing area determined in the previous period is used as the current optimal sensing area; when the position acquired currently is different from that determined in the previous period, the optimal sensing area for the SAR reducing antenna to sense the movement of the target object is re-determined according to the position acquired currently. The preset time interval may be selected according to a specific use condition or test certification condition of the mobile terminal.

In an example embodiment, Step 102 includes the following processing.

1. A logical selection switch is switched to connect different access ports preset on the SAR reducing antenna to the SAR reducing antenna.

2. The movement of the target object is sensed in the optimal sensing area through various access ports of the SAR reducing antenna, and movement information of the target object is acquired from the various access ports respectively.

3. When the movement information acquired from all of the various access ports fails to reach a preset threshold, the transmitting power of the mobile terminal is not adjusted; when movement information acquired from a certain one of the various access ports reaches the preset threshold, the logical selection switch is switched to the access port, and the transmitting power of the mobile terminal is controlled according to the movement information acquired from the access port; and when movement information acquired from a plurality of access ports reaches the preset threshold, the movement information acquired from the plurality of access ports is compared, and the logical selection switch is switched to an access port of optimal sensing according to a comparison result, and the transmitting power of the mobile terminal is controlled according to the movement information acquired from the access port. It needs to be noted that, the mobile terminal controls the radiation power thereof according to a preset threshold when working in the optimal sensing area, and a platform parameter may be configured according to a specific working condition of the mobile terminal in a laboratory in advance.

To sum up, in the embodiment of the present disclosure, a mobile terminal judges the position which a human body approaches dynamically as the human body approaches, dynamically selects an optimal sensing area of an proximity sensor antenna according to the determined position, controls the radiation power of the mobile terminal according to a sensing threshold when working in the optimal sensing area, and after a certain time interval, dynamically judges the position which the human body approaches again, if the position does not change, continues to control the radiation power according to a working condition of the previous optimal sensing area; when the position acquired currently is different from that determined in the previous period, dynamically selects to work according to another optimal sensing area and controls the radiation power according to a sensed condition, and repeats the dynamic judgment and selection process after a certain time interval.

The technical solutions of the embodiments of the present disclosure will be expounded below in combination with the accompanying drawings.

Figure 2:
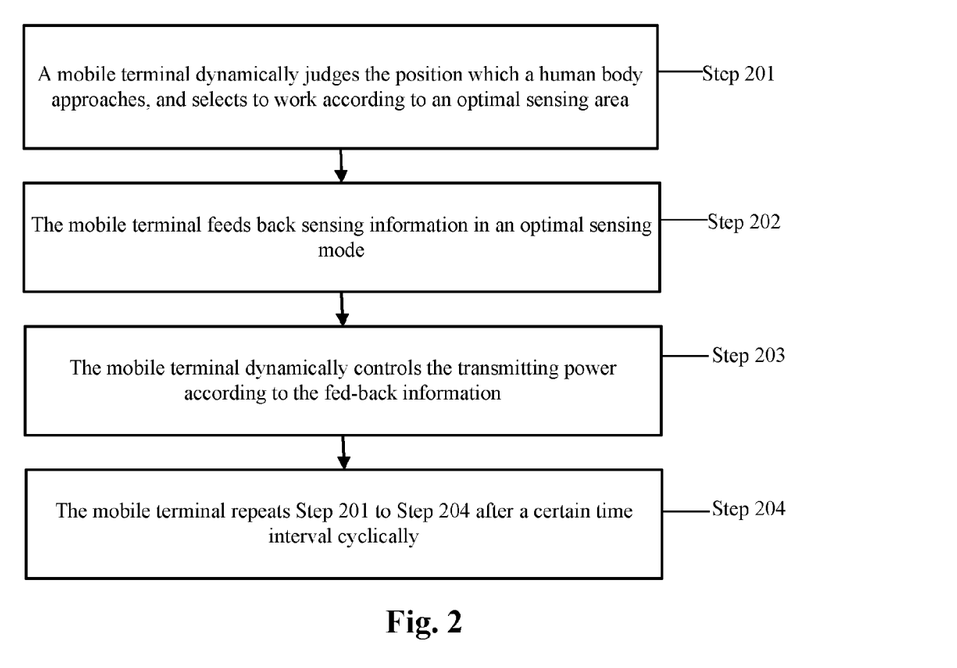
FIG. 2 is a flowchart of an SAR reduction processing method according to an embodiment of the present disclosure.

FIG. 2 is a flowchart of an SAR reduction processing method according to an embodiment of the present disclosure, as shown in FIG. 2, the method specifically includes the following processing:

Step 201: A mobile terminal dynamically judges the position which a human body approaches, and selects an optimal sensing area to sense the proximity of the human body.

Step 202: The mobile terminal feeds back sensed signal information to the next Step 203 in a sensing mode judged and selected in Step 201.

Step 203: The mobile terminal dynamically controls the transmitting power of the mobile terminal according to the signal information fed back in Step 202.

Step 204: The mobile terminal repeats Step 201 to Step 204 after a certain time interval cyclically.

If an SAR reducing function has been provided on an existing mobile terminal, there is a sensor antenna (i.e. an SAR reducing antenna) for sensing a position relationship between a human body and the mobile terminal on the mobile terminal. However, compared with a common SAR reducing antenna used in the related art, an SAR reducing antenna of an embodiment of the present disclosure may be provided with at least two access ports and an additional logical selection switch for selecting an access port. If the SAR reducing function is not provided, then the sensor antenna is added according to the embodiment of the present disclosure first so as to implement a corresponding function.

Figure 3:
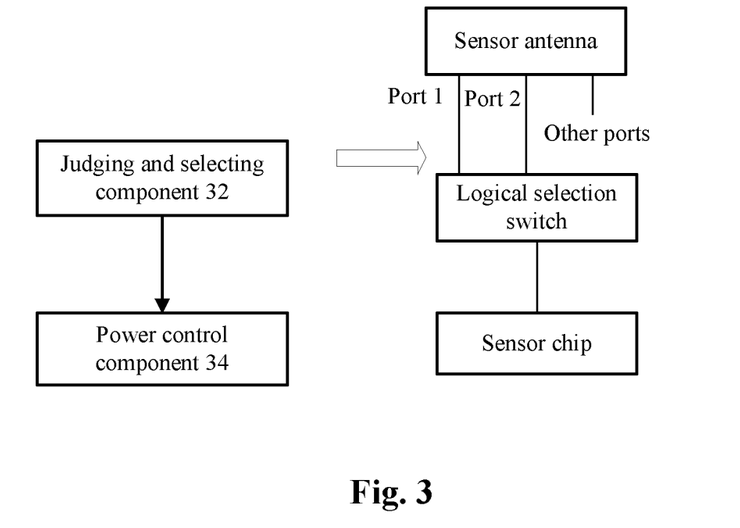
FIG. 3 is a structural block diagram of a mobile terminal executing the method for controlling transmitting power according to an embodiment of the present disclosure.

FIG. 3 is a structural block diagram of a mobile terminal executing the method for controlling transmitting power according to an embodiment of the present disclosure. As shown in FIG. 3, the mobile terminal includes: a judging and selecting component 32 and a power control component 34.

The judging and selecting component 32 includes: a sensor antenna which is configured to sense the proximity of a human body, a logical selection switch with a logical selection function, and an SAR reducing sensor chip with a logical control function. In an example embodiment, the sensor antenna may be provided with at least two access ports. A specific number and specific locations of the ports on the antenna may be determined according to a practical condition of the mobile terminal.

The power control component 34 may, but is not limited to apply a chip having a logical control function and configured to transmit information.

Figure 4:
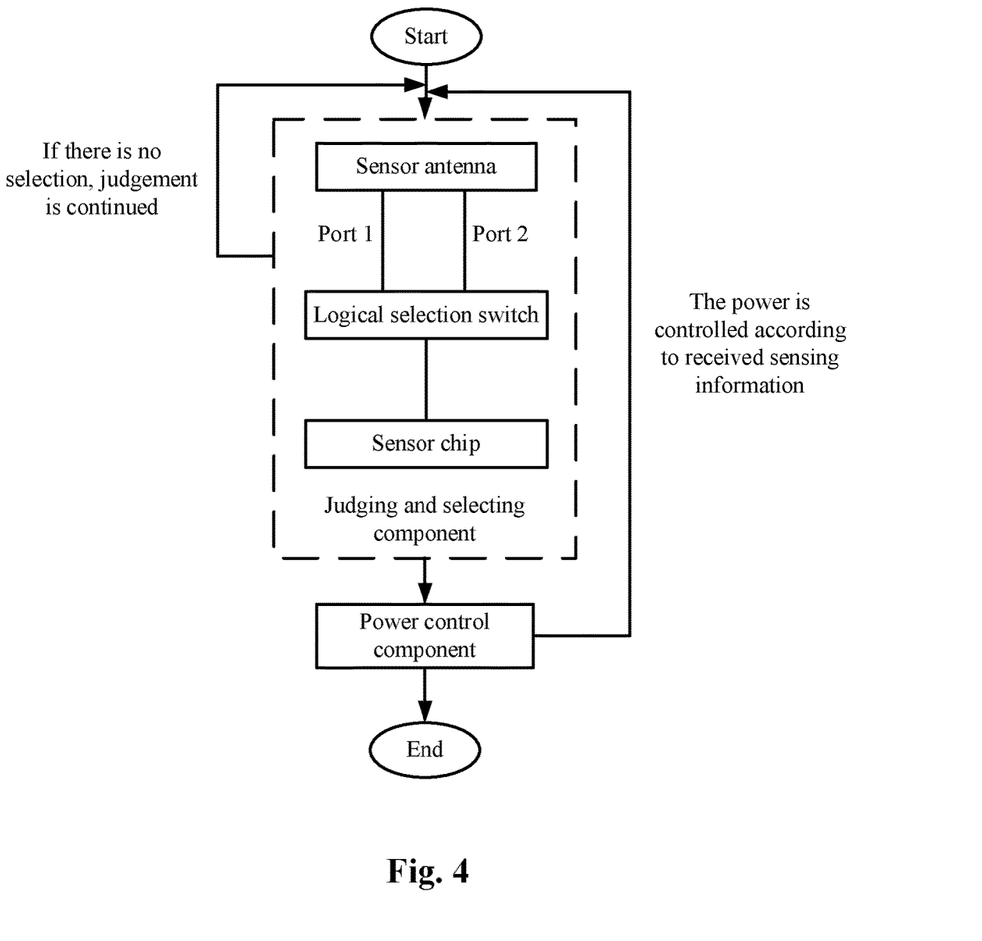
FIG. 4 is an example flowchart of SAR reduction of the mobile terminal as shown in FIG. 3 according to an embodiment of the present disclosure.

FIG. 4 is an example flowchart of SAR reduction of the mobile terminal as shown in FIG. 3 according to an embodiment of the present disclosure, and the flow specifically includes the following processing.

When a human body approaches the mobile terminal, the judging and selecting component 32 that is always in a judging state enables the logical selection switch to switch to different channels to connect the sensor antenna so as to perform judgment (the embodiment of the present disclosure describes a situation in which there are two ports). If signal values sensed by the two ports fail to reach a threshold that requires power control, the mobile terminal will not have any operation and still continues to perform the judgment. If a signal value sensed by either of the two ports reaches the threshold that requires power control, the logical selection switch is switched to this port, and in the meanwhile, the sensor chip feeds back a sensed signal to the power control component 34. If the signal values sensed by both ports reach the threshold that requires power control, the judging and selecting component 32 compares the signal values sensed by the two ports, and the logical selection switch is switched to a port of optimal sensing while the sensor chip feeds back sensed signal to the power control component 34.

The power control component 34 controls the transmitting power of the mobile terminal according to a received feedback signal.

It can be ensured at all time by combining the two steps above that the position of the approaching human body is sensed by the sensor antenna in an optimal working mode, thereby improving the sensing distance and range of a sensor, namely, improving the sensitivity thereof, avoiding the case that a sensing range of the sensor antenna is too close and too narrow, or even erroneous judgment is caused, and the radiation power of the mobile terminal can be hardly controlled in time, and the human body cannot be protected in time.

When the flow is implemented by the power control component 34, the power control component 34 controls the transmitting power of the mobile terminal, and one working flow ends. After a certain time interval, the mobile terminal dynamically judges the position which the human body approaches again, and the process above is performed repeatedly.

To sum up, by means of the technical solutions of the embodiments of the present disclosure, the position, which a human body approaches, on a mobile terminal is judged dynamically so that an optimal working mode of an SAR reducing antenna can be selected to sense a range of the distance between the human body and the mobile terminal and at the same time feed back this information to the mobile terminal, and the mobile terminal controls the radiation power thereof dynamically according to the fed-back information. In this way, it can be ensured at all time that the position of the approaching human body is sensed by the SAR reducing antenna in the optimal working mode, thereby improving the sensing distance and range of the SAR reducing antenna, namely, improving the sensitivity of the SAR reducing antenna.

Device Embodiment

Figure 5:
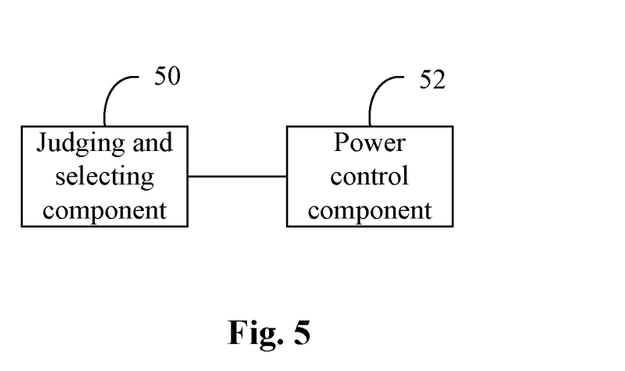
FIG. 5 is a structural block diagram of a device for controlling transmitting power according to an embodiment of the present disclosure.

A device for controlling transmitting power is provided according to an embodiment of the present disclosure. FIG. 5 is a structural block diagram of a device for controlling transmitting power according to an embodiment of the present disclosure. As shown in FIG. 5, the device for controlling transmitting power according to the embodiment of the present disclosure includes: a judging and selecting component 50, and a power control component 52. The components of the embodiment of the present disclosure will be expounded below.

The judging and selecting component 50 is configured to, when it is detected that a target object approaches a mobile terminal, determine a position, which the target object approaches, on the mobile terminal, and select according to the position, an optimal sensing area for an SAR reducing antenna of the mobile terminal to sense a movement of the target object; sense the movement of the target object in the optimal sensing area through the SAR reducing antenna and feed back movement information of the target object, wherein a range of the position, which the target object approaches, on the mobile terminal is: an area in a preset range taking a communication antenna of the mobile terminal as a centre, and the optimal sensing area is an area in a preset range closest to the target object.

Specifically, the judging and selecting component 50 is further configured to re-determine a position, which the target object approaches, on the mobile terminal at a preset time interval, and judge whether the position acquired currently is the same as that determined in a previous period; and when the position acquired currently is the same as that determined in the previous period, use an optimal sensing area determined in the previous period as the current optimal sensing area; when the position acquired currently is different from that determined in the previous period, re-determine, according to the position acquired currently, the optimal sensing area for the SAR reducing antenna to sense the movement of the target object.

The power control component 52 is configured to acquire the movement information, and control the transmitting power of the mobile terminal according to the movement information.

The judging and selecting component 50 is configured to: switch a logical selection switch to connect different access ports preset on the SAR reducing antenna to the SAR reducing antenna; sense the movement of the target object in the optimal sensing area through various access ports of the SAR reducing antenna, and respectively acquire movement information of the target object from the various access ports; when the movement information acquired from all of the various access ports fails to reach a preset threshold, not feed back the movement information; when movement information acquired from a certain one of the various access ports reaches the preset threshold, switch the logical selection switch to the access port, and feed back the movement information acquired from the access port; and when movement information acquired from a plurality of access ports reaches the preset threshold, compare the movement information acquired from the plurality of access ports, switch the logical selection switch to an access port of optimal sensing according to a comparison result, and feed back the movement information acquired from the access port.

To sum up, by means of the technical solutions of the embodiments of the present disclosure, the position, which a human body approaches, on a mobile terminal is judged dynamically so that an optimal working mode of an SAR reducing antenna can be selected to sense a range of the distance between the human body and the mobile terminal and at the same time feed back this information to the mobile terminal, and the mobile terminal controls the radiation power thereof dynamically according to the fed-back information. In this way, it can be ensured at all time that the position of the approaching human body is sensed by the SAR reducing antenna in the optimal working mode, thereby improving the sensing distance and range of the SAR reducing antenna, namely, improving the sensitivity of the SAR reducing antenna.

Obviously, those skilled in the art may make various changes and variations to the present disclosure without departing from the scope of the present disclosure. In this way, if these modifications and variations of the present disclosure belong to the scope of the claims of the present disclosure and equivalent techniques thereof, the present disclosure also intends to include these changes and variations.

INDUSTRIAL APPLICABILITY

The technical solutions provided by the embodiments of the present disclosure may be applied to the communications field. The position, which a human body approaches, on a mobile terminal is judged dynamically so that an optimal working mode of an SAR reducing antenna can be selected to sense a range of the distance between the human body and the mobile terminal and at the same time feed back this information to the mobile terminal, and the mobile terminal controls the radiation power thereof dynamically according to the fed-back information. In this way, it can be ensured at all time that the position of the approaching human body is sensed by the SAR reducing antenna in the optimal working mode, thereby improving the sensing distance and range of the SAR reducing antenna, namely, improving the sensitivity of the SAR reducing antenna.

What is claimed is:

1. A method for controlling transmitting power, comprising:
  when a mobile terminal detects that a target object approaches the mobile terminal, determining, by the mobile terminal, which position, on the mobile terminal, is the target object approaching towards, and selecting, by the mobile terminal, according to the position, an optimal sensing area of a Specific Absorption Rate (SAR) reducing antenna of the mobile terminal for the SAR reducing antenna to sense a movement of the target object; and
  acquiring, by the mobile terminal, movement information of the target object by sensing the movement of the target object in the optimal sensing area by the SAR reducing antenna, and controlling the transmitting power of the mobile terminal according to the movement information, wherein acquiring, by the mobile terminal, the movement information of the target object by sensing the movement of the target object in the optimal sensing area by the SAR reducing antenna, and controlling, by the mobile terminal, the transmitting power of the mobile terminal according to the movement information comprises:
  switching, by the mobile terminal, a logical selection switch to connect different access ports preset on the SAR reducing antenna to the SAR reducing antenna;
  sensing, by the mobile terminal, the movement of the target object in the optimal sensing area through various access ports of the SAR reducing antenna, and respectively acquiring movement information of the target object from the various access ports;
  when the movement information acquired from all of the various access ports fails to reach a preset threshold, not adjusting, by the mobile terminal, the transmitting power of the mobile terminal; when movement information acquired from a certain one of the various access ports reaches the preset threshold, switching, by the mobile terminal, the logical selection switch to the access port, and controlling, by the mobile terminal, the transmitting power of the mobile terminal according to the movement information acquired from the access port; and when movement information acquired from a plurality of access ports reaches the preset threshold, comparing, by the mobile terminal, the movement information acquired from the plurality of access ports, switching, by the mobile terminal, the logical selection switch to an access port of optimal sensing according to a comparison result, and controlling, by the mobile terminal, the transmitting power of the mobile terminal according to the movement information acquired from the access port.

2. The method as claimed in claim 1, further comprising:
  re-determining, by the mobile terminal, which position, on the mobile terminal, is the target object approaching towards at a preset time interval, and judging, by the mobile terminal, whether the position acquired currently is the same as that determined in a previous period; and
  when the position acquired currently is the same as that determined in the previous period, using, by the mobile terminal, an optimal sensing area determined in the previous period as the current optimal sensing area; when the position acquired currently is different from that determined in the previous period, re-determining, by the mobile terminal, according to the position acquired currently, the optimal sensing area of the SAR reducing antenna of the mobile terminal for the SAR reducing antenna to sense the movement of the target object.

3. The method as claimed in claim 2, wherein a range of the position, which the target object is approaching towards, on the mobile terminal is: an area in a preset range taking a communication antenna of the mobile terminal as a centre.

4. The method as claimed in claim 2, wherein the optimal sensing area is an area in a preset range closest to the target object.

5. The method as claimed in claim 1, wherein a range of the position, which the target object is approaching towards, on the mobile terminal is: an area in a preset range taking a communication antenna of the mobile terminal as a centre.

6. The method as claimed in claim 1, wherein the optimal sensing area is an area in a preset range closest to the target object.

7. A device for controlling transmitting power, comprising:
  a judging and selecting component, configured to, when it is detected that a target object approaches a mobile terminal, determine which position, on the mobile terminal, is the target object approaching towards, and select according to the position, an optimal sensing area of a Specific Absorption Rate (SAR) reducing antenna of the mobile terminal for the SAR reducing antenna to sense a movement of the target object; sense the movement of the target object in the optimal sensing area through the SAR reducing antenna and feed back movement information of the target object; and a power control component, coupled with the judging and selecting component, configured to acquire the movement information, and control the transmitting power of the mobile terminal according to the movement information;

wherein the judging and selecting component is configured to:

switch a logical selection switch to connect different access ports preset on the SAR reducing antenna to the SAR reducing antenna;

sense the movement of the target object in the optimal sensing area through various access ports of the SAR reducing antenna, and respectively acquire movement information of the target object from the various access ports;

when the movement information acquired from all of the various access ports fails to reach a preset threshold, not feed back the movement information; when movement information acquired from a certain one of the various access ports reaches the preset threshold, switch the logical selection switch to the access port, and feed back the movement information acquired from the access port; and when movement information acquired from a plurality of access ports reaches the preset threshold, compare the movement information acquired from the plurality of access ports, switch the logical selection switch to an access port of optimal sensing according to a comparison result, and feed back the movement information acquired from the access port.

8. The device as claimed in claim 7, wherein the judging and selecting component is further configured to:

re-determine which position, on the mobile terminal, is the target object approaching towards at a preset time interval, and judge whether the position acquired currently is the same as that determined in a previous period; and when the position acquired currently is the same as that determined in the previous period, use an optimal sensing area determined in the previous period as the current optimal sensing area; when the position acquired currently is different from that determined in the previous period, re-determine, according to the position acquired currently, the optimal sensing area of the SAR reducing antenna of the mobile terminal for the SAR reducing antenna to sense the movement of the target object.

9. The device as claimed in claim 8, wherein a range of the position, which the target object is approaching towards, on the mobile terminal is: an area in a preset range taking a communication antenna of the mobile terminal as a centre.

10. The device as claimed in claim 8, wherein the optimal sensing area is an area in a preset range closest to the target object.

11. The device as claimed in claim 7, wherein a range of the position, which the target object is approaching towards, on the mobile terminal is: an area in a preset range taking a communication antenna of the mobile terminal as a centre.

12. The device as claimed in claim 7, wherein the optimal sensing area is an area in a preset range closest to the target object.

* * * * *